United States Patent
Jackson et al.

(10) Patent No.: US 10,252,590 B2
(45) Date of Patent: Apr. 9, 2019

(54) VERTICALLY ARTICULATING TRAILER HITCH RECEIVER FOR VEHICLE

(71) Applicant: Ford Global Technologies, LLC, Dearborn, MI (US)

(72) Inventors: Eric Emil Jackson, Canton, MI (US); Joseph L. Buchwitz, Huntington Woods, MI (US); James Adam Drozdowski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/427,583

(22) Filed: Feb. 8, 2017

(65) Prior Publication Data

US 2018/0222264 A1 Aug. 9, 2018

(51) Int. Cl.
| | | |
|---|---|---|
| *B60D 1/40* | (2006.01) | |
| *B60D 1/46* | (2006.01) | |
| *B60D 1/24* | (2006.01) | |
| *B60D 1/48* | (2006.01) | |
| *B60D 1/62* | (2006.01) | |

(52) U.S. Cl.
CPC .............. *B60D 1/40* (2013.01); *B60D 1/246* (2013.01); *B60D 1/465* (2013.01); *B60D 1/485* (2013.01); *B60D 1/62* (2013.01)

(58) Field of Classification Search
CPC ........... B60D 1/40; B60D 1/465; B60D 1/065
See application file for complete search history.

(56) References Cited

U.S. PATENT DOCUMENTS

| | | | | |
|---|---|---|---|---|
| 4,951,957 A | * | 8/1990 | Gullickson | B60D 1/40 280/479.2 |
| 5,009,446 A | * | 4/1991 | Davis | B60D 1/40 280/477 |
| 5,236,214 A | * | 8/1993 | Taylor | B60D 1/155 280/402 |
| 5,322,315 A | * | 6/1994 | Carsten | B60D 1/40 280/479.2 |
| 5,464,241 A | | 11/1995 | Flater | |
| 5,727,805 A | * | 3/1998 | La Roque | B60D 1/155 280/478.1 |
| 6,527,292 B2 | * | 3/2003 | Adair | B60D 1/485 280/491.3 |
| 6,644,680 B1 | * | 11/2003 | Coe | B60D 1/36 280/477 |
| 6,663,133 B1 | | 12/2003 | Rosenlund | |
| 6,974,146 B2 | | 12/2005 | Abair | |

(Continued)

*Primary Examiner* — Kevin Hurley
(74) *Attorney, Agent, or Firm* — LeClairRyan

(57) ABSTRACT

The disclosed inventive concept provides a vertically articulating trailer hitch assembly for use with a vehicle, and particularly for use with an autonomous vehicle. The trailer hitch assembly is pivotally attached to the vehicle frame. The hitch assembly is allowed to swing away from the vehicle frame from a lowered position in which the trailer ball is uncoupled from the hitch coupler of the trailer to a raised position in which the trailer ball is coupled to the hitch coupler. The hitch assembly typically includes a receiver that has a long axis. The vehicle frame has a long axis. When the hitch assembly is in its lowered position, the long axis of the receiver is out of alignment with the long axis of the frame. When the hitch assembly is in its raised position, the long axis of the receiver is aligned with the long axis of the frame.

7 Claims, 10 Drawing Sheets

(56) References Cited

U.S. PATENT DOCUMENTS

| | | | | |
|---|---|---|---|---|
| 7,134,679 B2* | 11/2006 | Krstovic | ................ | B60D 1/36 |
| | | | | 280/479.1 |
| 7,338,064 B1* | 3/2008 | Williams | ................ | B60D 1/54 |
| | | | | 280/491.1 |
| 7,793,967 B2* | 9/2010 | McConnell | ............ | B60D 1/54 |
| | | | | 224/496 |
| 8,091,913 B1 | 1/2012 | White | | |
| 8,469,385 B2 | 6/2013 | Wergin | | |
| 8,485,207 B1* | 7/2013 | Boyington | ............ | E04H 15/06 |
| | | | | 135/16 |
| 8,678,421 B1* | 3/2014 | Williams, Jr. | ......... | B60D 1/246 |
| | | | | 280/479.1 |
| 8,905,425 B2* | 12/2014 | Williams, Jr. | ........... | B60D 1/36 |
| | | | | 280/478.1 |
| 9,387,739 B2* | 7/2016 | Babuska | ................ | B60D 1/54 |
| 2003/0137126 A1* | 7/2003 | Reuter | ................ | B60D 1/246 |
| | | | | 280/479.1 |
| 2007/0080516 A1* | 4/2007 | Simmons | ............... | B60D 1/40 |
| | | | | 280/491.3 |
| 2015/0184795 A1* | 7/2015 | Babuska | ................ | B60D 1/07 |
| | | | | 248/314 |
| 2016/0185170 A1 | 6/2016 | McAllister | | |

* cited by examiner

VERTICALLY ARTICULATING TRAILER HITCH RECEIVER FOR VEHICLE

TECHNICAL FIELD

The disclosed inventive concept relates to trailer hitches for vehicles. More particularly, the disclosed inventive concept relates to a vertically articulating trailer hitch or receiver that maintains structural function and enables smooth and certain ball/hitch engagement. While being suitable for use with a variety of vehicles, the disclosed inventive concept is particularly adaptable for use with autonomous vehicles in which the autonomous alignment of the hitch receiver ball with trailer coupling is desired.

BACKGROUND OF THE INVENTION

A wide variety of vehicles including automobiles, trucks, sport utility vehicles and recreational vehicles, are equipped with a trailer hitch arrangement. The trailer hitch is conventionally attached to or near (usually below) the vehicle's rear bumper. The conventional trailer hitch arrangement includes a trailer ball attached to a ball mount that is either fixed directly to a rear support structure on a vehicle or is attached to a ball mount draw bar that is inserted into a receiver. The receiver is attached to the rear support structure.

The hitch coupler of the trailer includes a ball socket that is fitted over the ball of the ball mount. The latter arrangement is a more sophisticated arrangements that is designed generally for pulling larger loads. The drawbar can be inserted or removed from the receiver as desired. A hitch pin is inserted to hold the drawbar to the hitch receiver. A spring cotter pin holds the hitch pin in its position.

These conventional hitch arrangements for towing have generally met the needs of vehicle operators over the years. However, changes in technology, particularly with respect to the advent of the autonomous vehicle, require that known hitch arrangements be reconsidered as they are not adapted to autonomous vehicle operation. For example, the vertical receiver ball height as measured from the ground is misaligned with the hitch coupler during autonomous vehicle maneuvering. In addition, today's fixed ball mount cannot adjust vertically to locate under the trailer's hitch coupler Known trailer attaching technology thus is not suitable for use with the autonomous vehicle. There is a need for an adjustable articulating rear trailer hitch that is capable of autonomously aligning the ball mount with the trailer hitch coupler.

Accordingly, known approaches to coupling a trailer to a tow vehicle cannot provide satisfactory results when the tow vehicle is an autonomous vehicle. As in so many areas of vehicle technology, there is always room for improvement related to trailer hitch systems for a vehicle.

SUMMARY OF THE INVENTION

The disclosed inventive concept provides a vertically articulating trailer hitch assembly for use a vehicle, and particularly for use with an autonomous vehicle, that maintains structural function while providing the automated features desired by the customer. The trailer hitch assembly is pivotally attached to the vehicle frame. The hitch assembly is allowed to swing away from the vehicle frame in a controlled manner from a lowered position in which the trailer ball is uncoupled from the hitch coupler of the trailer to a raised position in which the trailer ball is coupled to the hitch coupler.

The vertically articulating trailer hitch assembly typically includes a receiver that has a long axis. The vehicle frame has a long axis. When the hitch assembly is in its lowered position, the long axis of the receiver is out of alignment with the long axis of the frame. When the hitch assembly is in its raised position, the long axis of the receiver is aligned with the long axis of the frame.

According to one arrangement of the disclosed inventive concept, a receiver assembly is fixedly attached to a hitch assembly cross-member. The cross-member includes a pair of spaced apart attachment arms that extend vehicle-forward. Each arm is pivotally attached at its forward-most end attached to the vehicle frame. A latch having a latch pin is provided to lock the hitch assembly cross-member in its raised position. In this arrangement, the cross-member is raised and lowered by a driver such as an electric motor.

According to another arrangement of the disclosed inventive concept, a receiver assembly is provided that includes a receiver. The receiver assembly is pivotally attached to a hitch assembly cross-member. In this arrangement, the cross-member is fixed to the frame. A lock assembly including a latch capture pawl having a hook portion and a pawl capture shaft attached is provided. The pawl capture shaft is fixed to the receiver. In this arrangement, the receiver assembly is raised and lowered by a driver such as an electric motor.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
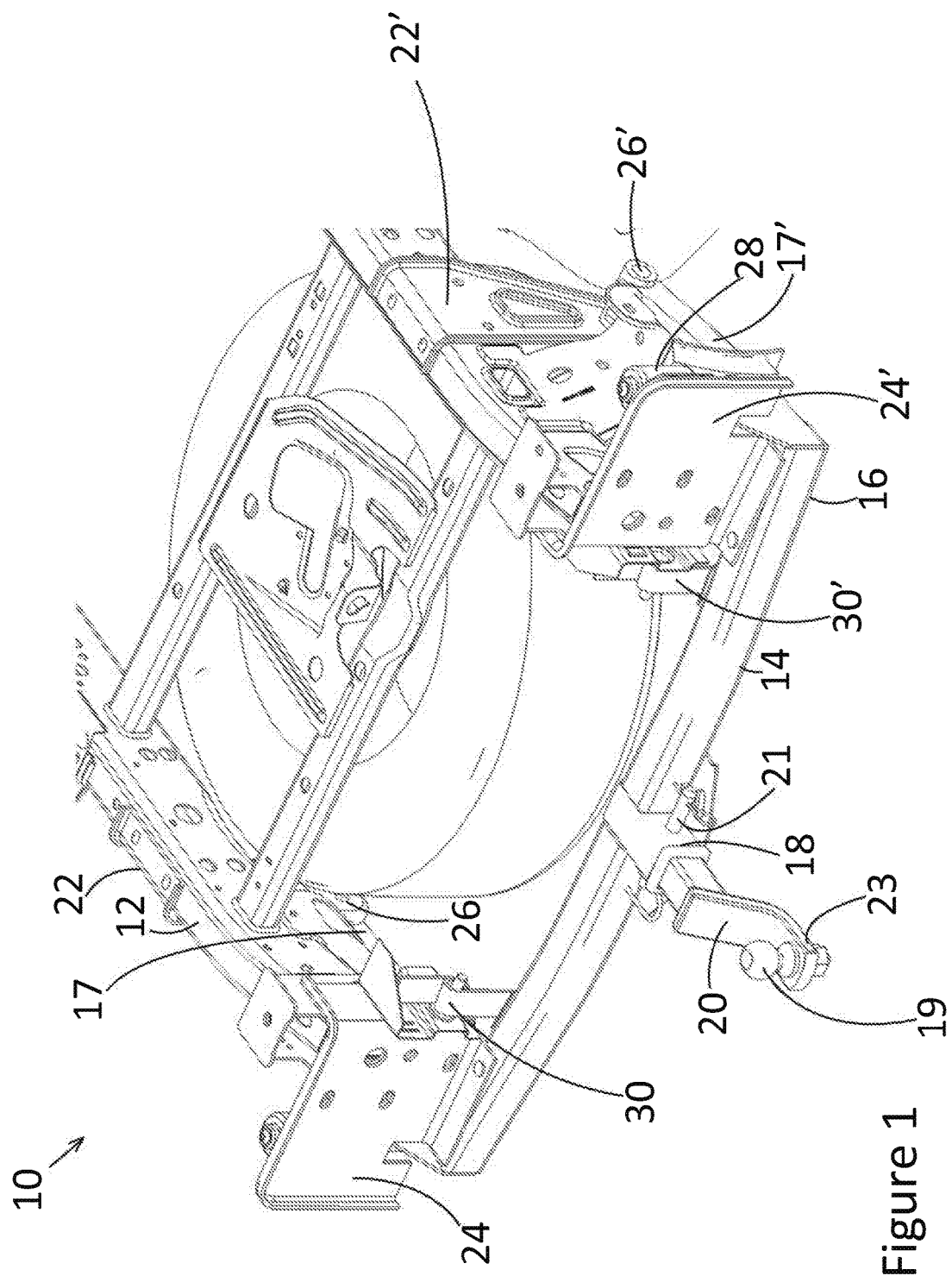
FIG. 1 is a perspective view of one embodiment of an articulating hitch assembly according to disclosed inventive concept.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the articulating hitch assembly according to two general embodiments. In general, FIGS. 1 through 4 are directed to one embodiment of the articulating hitch assembly according to disclosed inventive concept. FIGS. 5 through 10 are directed to another embodiment of the articulating hitch assembly according to disclosed inventive concept. Regardless of the embodiment, and in the case of a conventional tow vehicle, the articulating hitch assembly of the disclosed inventive concept is operated by the vehicle operator from the vehicle. In the case of an autonomous tow vehicle, the articulating hitch assembly is operated remotely.

Figure 2:
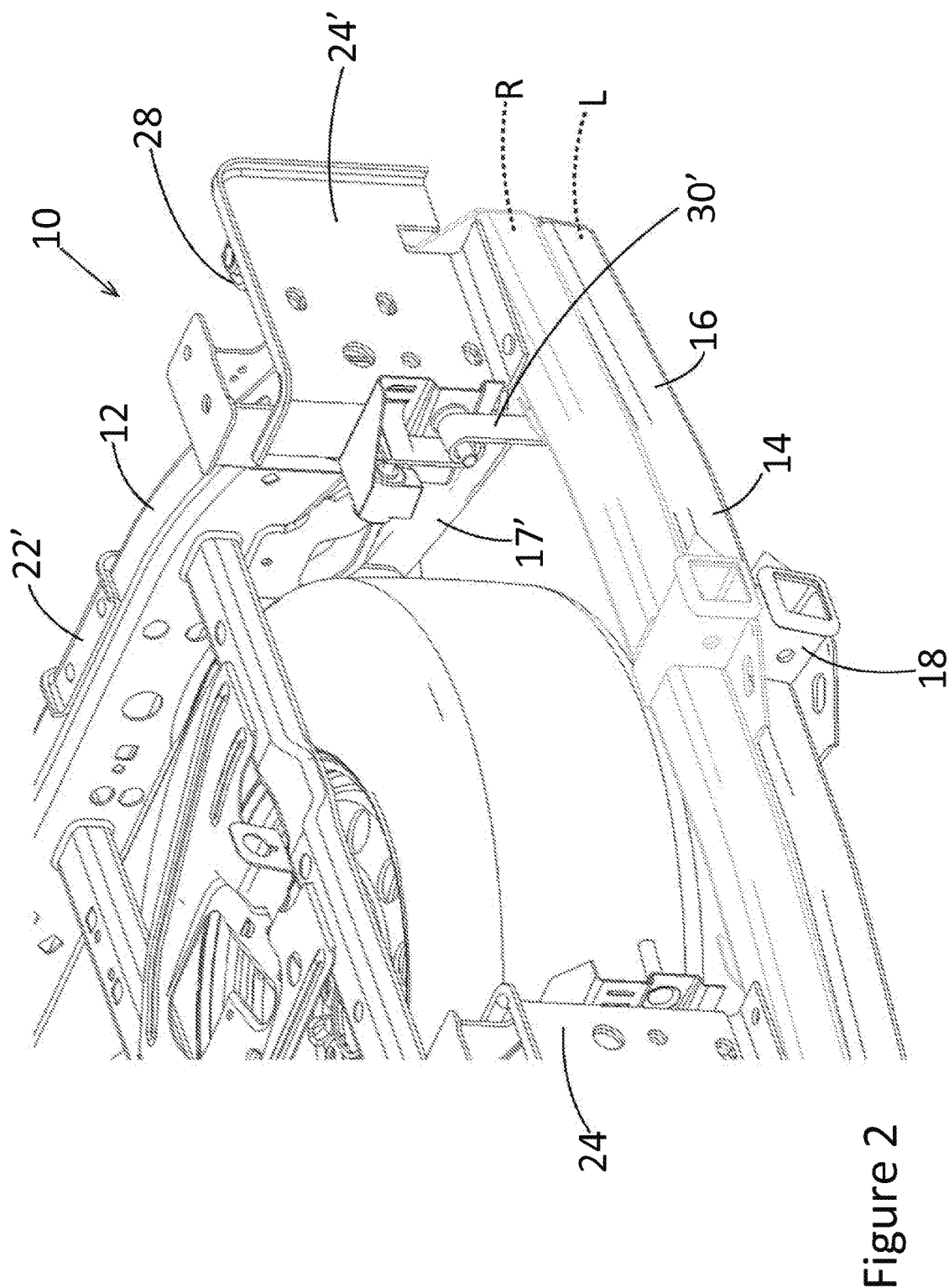
FIG. 2 is another perspective view of the embodiment of the articulating hitch assembly shown in FIG. 1.

Referring to FIGS. 1 and 2, perspective views of a one embodiment of an articulating hitch assembly according to disclosed inventive concept is shown, generally illustrated as 10. It is to be understood that articulating hitch assembly 10 as shown is suggestive and is not intended as being limiting. For example, while a ball mount receiver is illustrated in the figures and is discussed in relation thereto, a ball mount fixed directly to the movable part may be possible without deviating from the spirit or scope of the invention as described.

The articulating hitch assembly 10 is operatively associated with a vehicle frame 12. The frame 12 as illustrated is exemplary as a virtually unlimited array of frame designs to which the articulating hitch assembly 10 may be attached is possible. Movably associated with the frame 12 is a hitch and receiver assembly 14. The hitch and receiver assembly 14 includes a hitch assembly cross-member 16 having a pair of spaced apart attachment arms 17 and 17' that extend vehicle-forward from the hitch assembly cross-member 16.

A hitch receiver 18 is fixed to the hitch assembly cross-member 16. A ball mount 20 is slidably insertable into the hitch receiver 18. A ball mount pin and clip assembly 21 are provided to retain the ball mount 20 in the hitch receiver 18 as is known in the art. The ball mount 20 includes a trailer ball 19 and a base plate 23.

A pair of spaced-apart vehicle forward frame mounting brackets 22 and 22' is fixed to the frame 12. A pair of spaced apart vehicle reward frame mounting brackets 24 and 24' is also fixed to the frame 12. The attachment arms 17 and 17' of the hitch assembly cross-member are pivotally attached to the forward frame mounting brackets 22 and 22' by a pair of pivot stud 26 and 26'. Specifically, the attachment arm 17 is movably attached to the vehicle forward frame mounting bracket 22 by the pivot stud 26 while the attachment arm 17' is movably attached to the vehicle forward frame mounting bracket 22' by the pivot stud 26'.

The hitch and receiver assembly 14 is selectively movable up and down between raised and lowered positions as desired. The hitch assembly cross-member 16 is moved to its lowered position ("L" in FIG. 2) when the ball mount 20 is being positioned between the hitch coupler of a trailer (not shown) and is moved to its raised position ("R" in FIG. 2) to thereby attach the ball mount 20 to the trailer's hitch coupler. This selective movement is made possible by an electric motor and pinion gear assembly 28. The hitch and receiver assembly 14 is locked into its raised position by a pair of latch and solenoid assemblies 30 and 30'.

Figure 3:
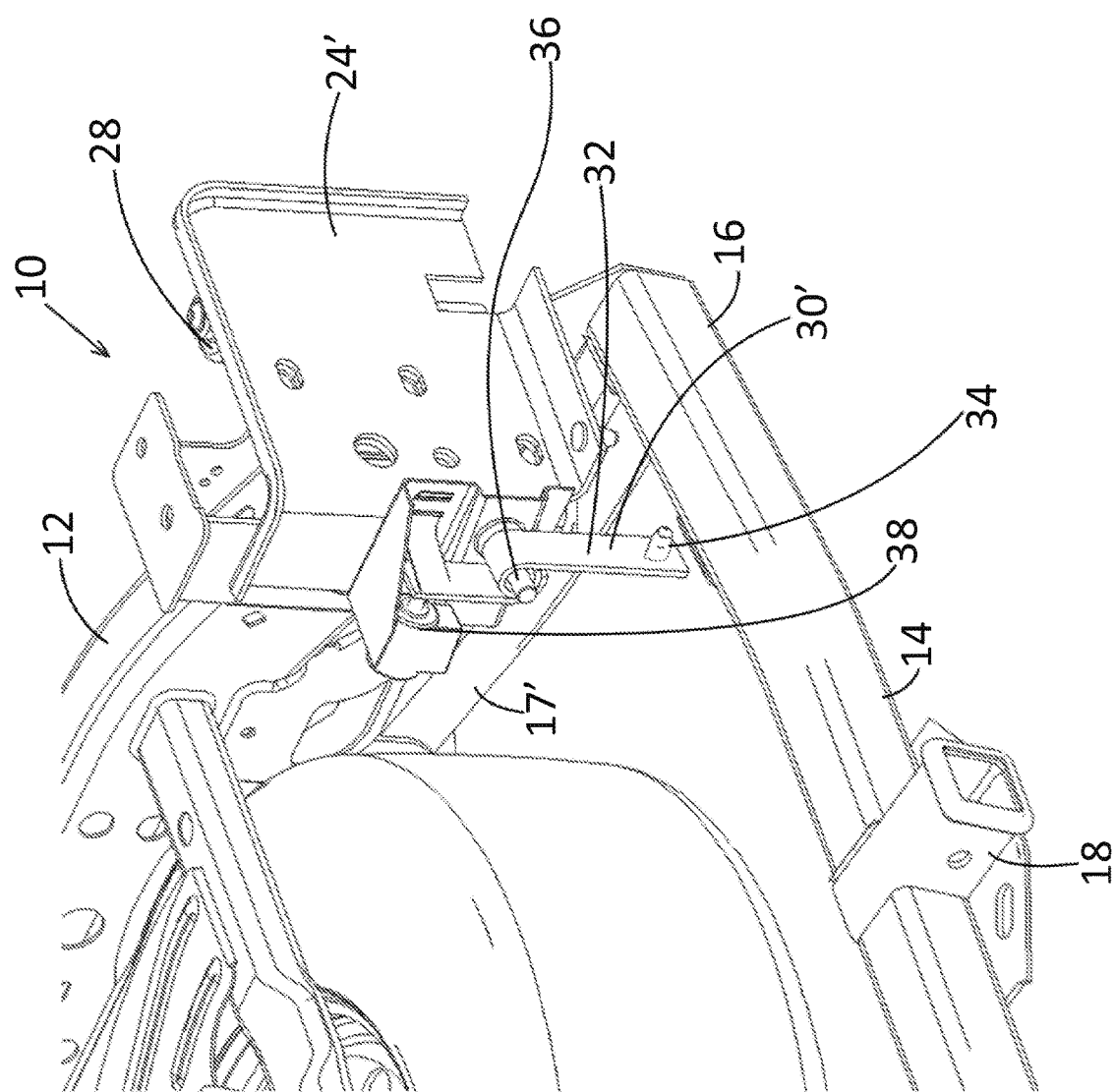
FIG. 3 is a perspective view of the embodiment of the articulating hitch assembly of FIG. 1 illustrating the hitch assembly cross member and receiver in their lowered position.

Details of one of the latch and solenoid assemblies is illustrated in FIG. 3 in which a perspective view of the embodiment of the articulating hitch assembly of FIGS. 1 and 2 is illustrated in which the hitch and receiver assembly 14 is shown in its lowered position. In this position, no locking arrangement is necessary. However, when the hitch and receiver assembly 14 is moved to its raised position for engagement with a trailer hitch coupler, the disclosed inventive concept includes a latch arrangement by which the hitch and receiver assembly 14 is safely and securely retained in its raised position for safe vehicle operation.

One of the latch and solenoid assemblies, that is, assembly 30', is illustrated in FIG. 3. However, it is to be understood that the latch and solenoid assembly 30, other than being a mirror image, is identical to the assembly 30'. The latch and solenoid assembly 30' includes a pivotally movable pin arm 32 having a locking pin 34 extending from one of its sides. The locking pin 34 engages an aperture (not shown) formed in the back side of the hitch assembly cross-member 16 when in its locked position. Pivotal movement of the pin arm 32 is made possible by the provision of a pivot pin 36 to which the pin arm 32 is movably attached. Selective movement of the pin arm 32 between its latched and unlatched positions is controlled by a solenoid assembly 38.

Figure 4:
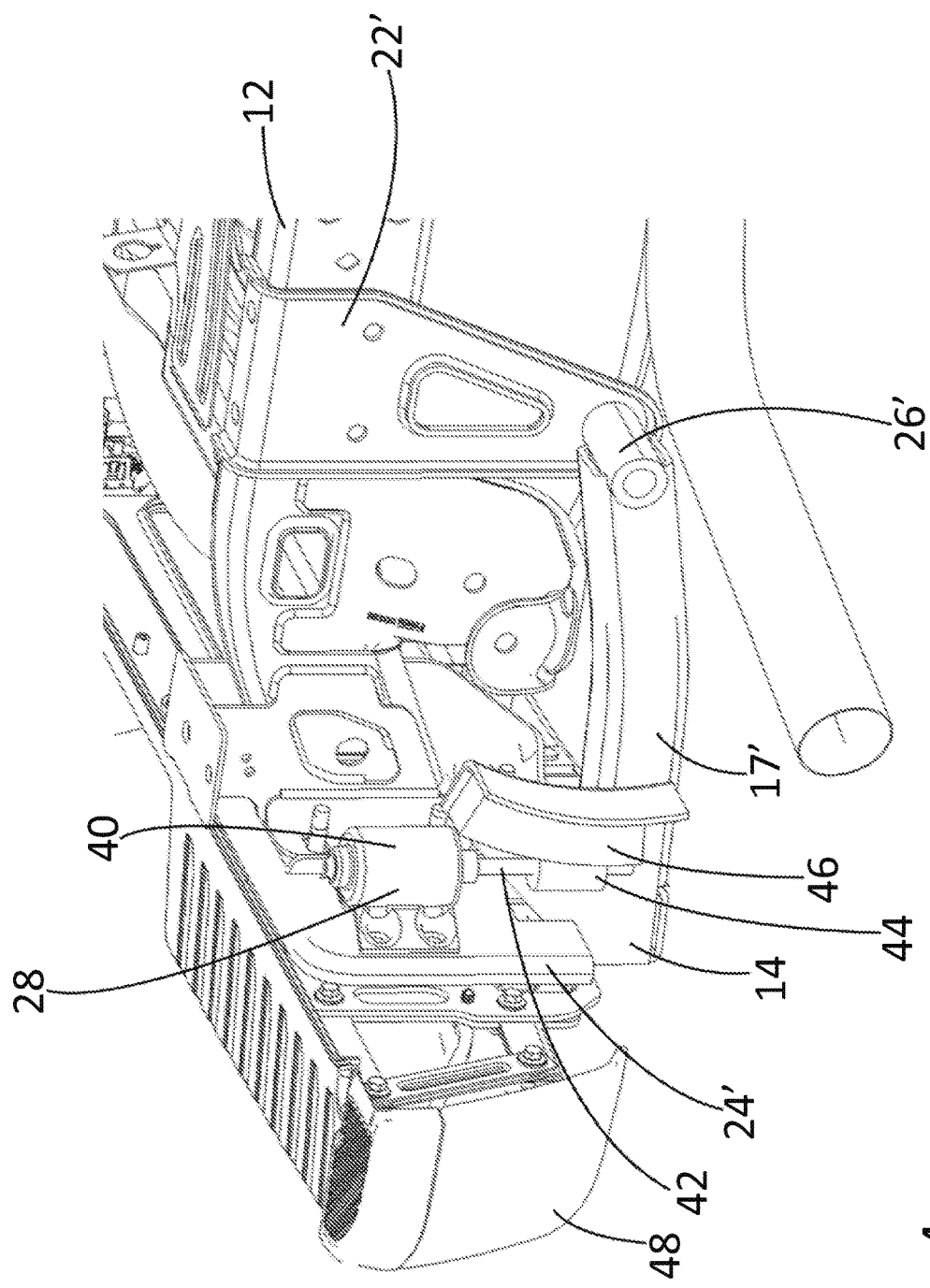
FIG. 4 is a side view of the embodiment of the articulating hitch assembly of FIG. 1 illustrating details of the electric motor and pinion gear assembly for regulating the height of the hitch assembly cross member and receiver.

The up-and-down movement of the hitch assembly cross-member 16 is selectively provided for by the electric motor and pinion gear assembly 28 as noted above. Details of the arrangement of the electric motor and pinion gear assembly 28 and its association with the hitch and receiver assembly 14 are illustrated in FIG. 4. Referring thereto, the electric motor and pinion gear assembly 28 includes an electric motor 40 that is fixedly attached to the frame 12. A driveshaft 42 extends from the electric motor 40. It is to be understood that the provision of the electric motor 40 is only suggestive as alternative methods of moving the receiver assembly 14 are possible, such as a pneumatic arrangement.

A pinion 44 is fixed to the driveshaft 42. A curved rack 46 is fixedly attached to the attachment arm 17'. The pinion 44 is operatively associated with the curved rack 46. A bumper 48 is conventionally attached to the frame 12.

According to this arrangement, the electric motor 40 is selectively operated so as to cause the hitch and receiver assembly 14 to be raised or lowered depending upon the position of the vehicle relative to the hitch coupler of the trailer. If the hitch and receiver assembly 14 is lowered such that the trailer hitch ball of the ball mount 20 may be positioned under the vehicle, the electric motor and pinion gear assembly 28 operates so as to cause the ball mount 20 to be moved into the hitch coupler of the trailer. Once in position, the pin arm 32 of the latch and solenoid assembly 30' is moved into position toward the pin-receiving aperture formed in the hitch assembly cross-member 16, thereby locking the hitch and receiver assembly 14 against unintended lowering.

As noted above, FIGS. 1 through 4 relate to one embodiment of the disclosed inventive concept for an articulating hitch assembly. FIGS. 5 through 10 illustrate another embodiment of the articulating hitch assembly according to the disclosed inventive concept.

Figure 5:
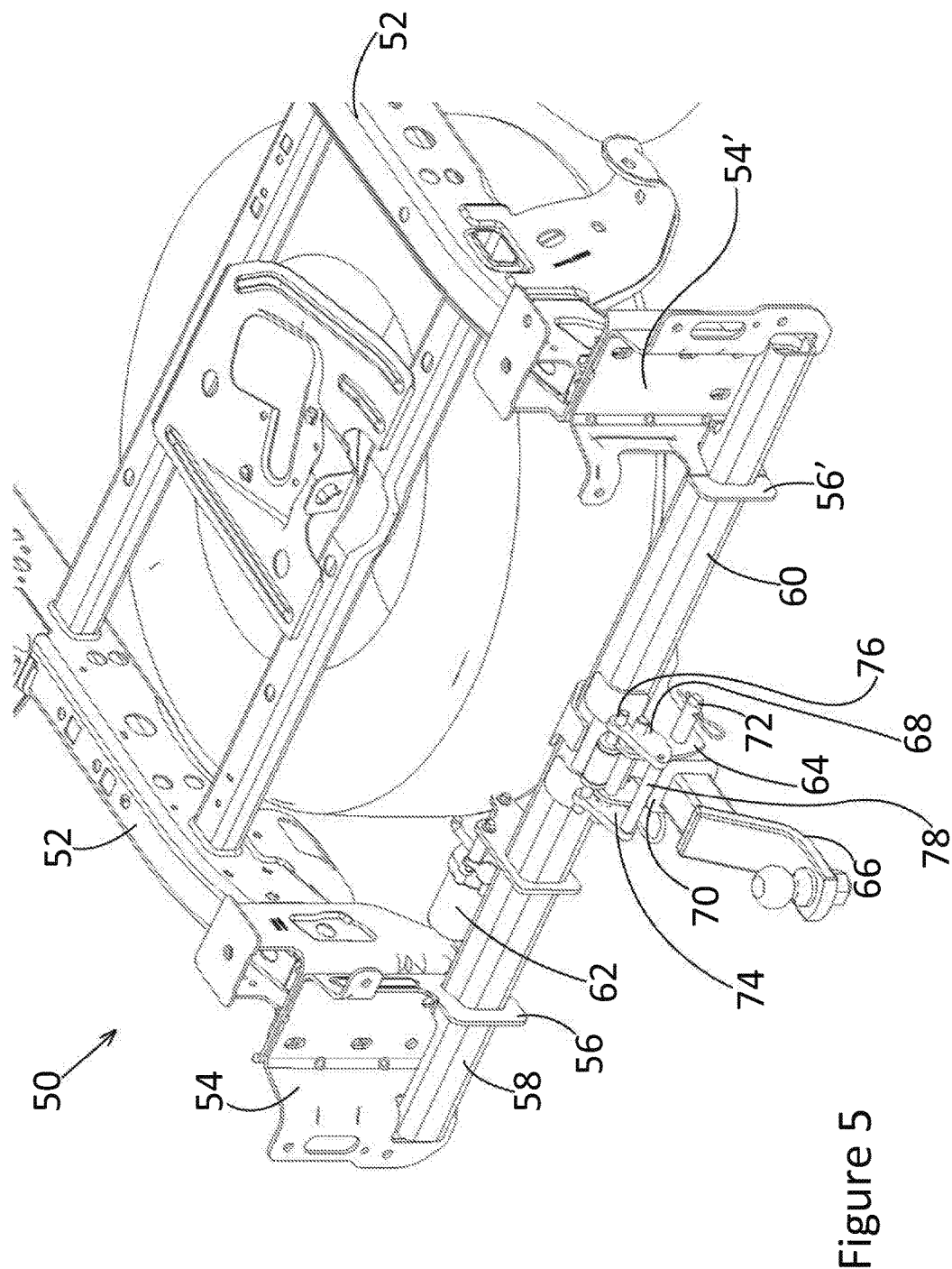
FIG. 5 is a perspective view of another embodiment of an articulating hitch assembly according to disclosed inventive concept.
Figure 6:
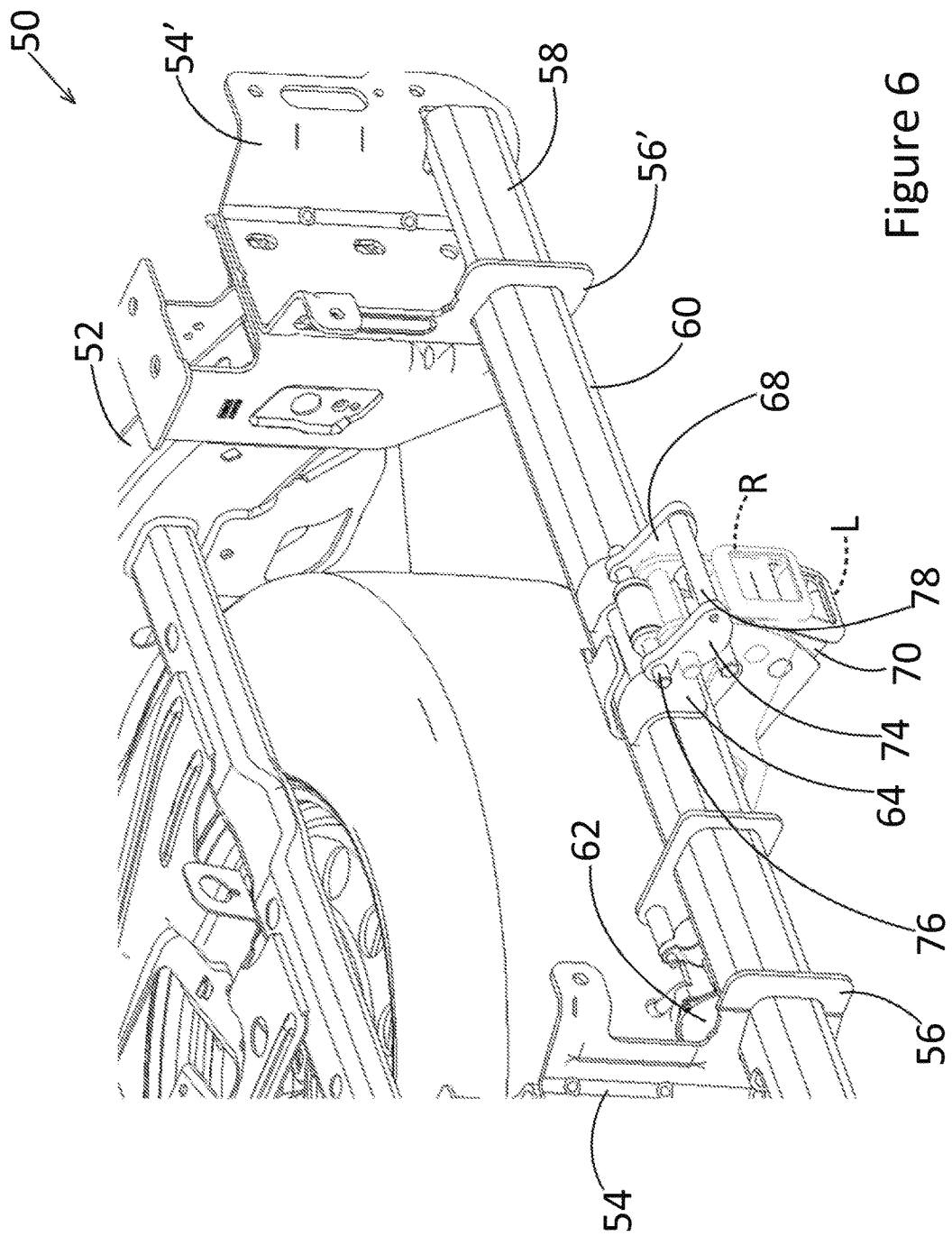
FIG. 6 is another perspective view of the embodiment of the articulating hitch assembly shown in FIG. 5.

Referring to FIGS. 5 and 6, perspective views of another embodiment of an articulating hitch assembly according to disclosed inventive concept is shown, generally illustrated as 50. It is to be understood that articulating hitch assembly 50 as shown is suggestive and is not intended as being limiting. For example, while a ball mount receiver is illustrated in the figures and is discussed in relation thereto, a ball mount fixed directly to the movable part may be possible without deviating from the spirit or scope of the invention as described.

The articulating hitch assembly 50 is operatively associated with a vehicle frame 52. The frame 52 as illustrated is exemplary as a virtually unlimited array of frame designs to which the articulating hitch assembly 50 may be attached is possible. The frame 52 includes a pair of spaced apart frame mounting brackets 54 and 54'. The frame mounting bracket 54 includes a wraparound attachment brace 56 and the frame mounting bracket 54' includes a wraparound attachment brace 56'.

The articulating hitch assembly 50 includes a hitch receiver assembly 58. The hitch receiver assembly 58 includes a fixed lateral tube 60 that is captured and held in place by the wraparound attachment braces 56 and 56'. An electric motor and rod assembly 62 is provided for selective movement of an articulating receiver assembly 64. The hitch receiver assembly 58 further includes a ball mount 66. A locking assembly 68 allows for selective locking and unlocking of a receiver assembly 70 in its raised or lowered position. A portion of the ball mount 66 is locked into position within the receiver assembly 70 by a ball mount pin and clip assembly 72.

The locking assembly 68 allows for driverless attachment of the autonomous tow vehicle to attach the ball of the ball mount 66 to the hitch coupler of the trailer. However, it may be necessary in the event of an emergency for an operator to be able to manually release the tow vehicle from the trailer. Accordingly, the disclosed inventive concept provides a safety latch assembly 74 that allows for manual release by an operator. The safety latch assembly 74 includes a common pivot pin 76 and a safety latch handle 78. Operation of the safety latch handle 78 is set forth below.

Figure 7:
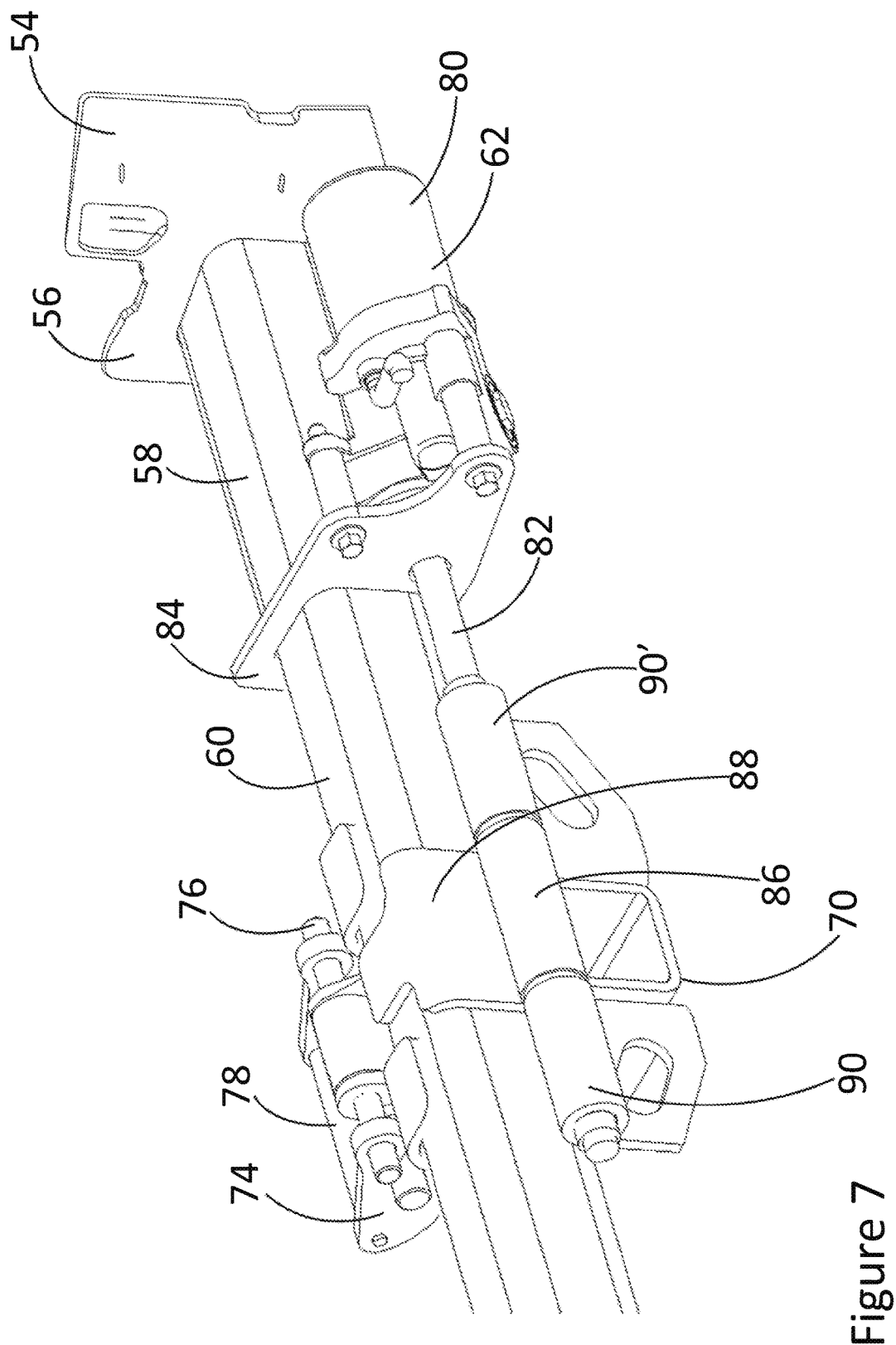
FIG. 7 is a view illustrating the back side of the hitch and receiver assembly in which the associated electric motor and rod assembly is shown in detail.

Unlike the embodiment of the disclosed inventive concept set forth in FIGS. 1 through 4 and discussed in relation thereto in which the entire hitch assembly is movable between raised and lowered positions, only the receiver assembly 70 of the articulating hitch assembly 50 is movable between raised and lowered positions. The electric motor and rod assembly 62 move the receiver assembly 70 between these positions. The electric motor and rod assembly 62 is illustrated in FIG. 7 in which the back side of the articulating hitch assembly 50 is illustrated. More particularly, and with reference to FIG. 7, the electric motor and rod assembly 62 includes an electric motor 80 and a rotating drive rod 82 extending therefrom. A bracket 84 holds the electric motor and rod assembly 62 to the fixed lateral tube 60. It is to be understood that the provision of the electric motor 80 is only suggestive as alternative methods of moving the receiver assembly 70 are possible, such as a pneumatic arrangement.

A fixed rod sleeve 86 is attached to the lateral tube 60 via an attachment strap 88. The rotating drive rod 82 extends through the fixed rod sleeve 86 and can freely rotate therein. A pair of spaced apart rotating sleeves 90 and 90' is attached to the receiver assembly 70. The rotating drive rod 82 is also fixedly attached to each of the spaced apart rotating sleeves 90 and 90' for rotation therewith.

Figure 8:
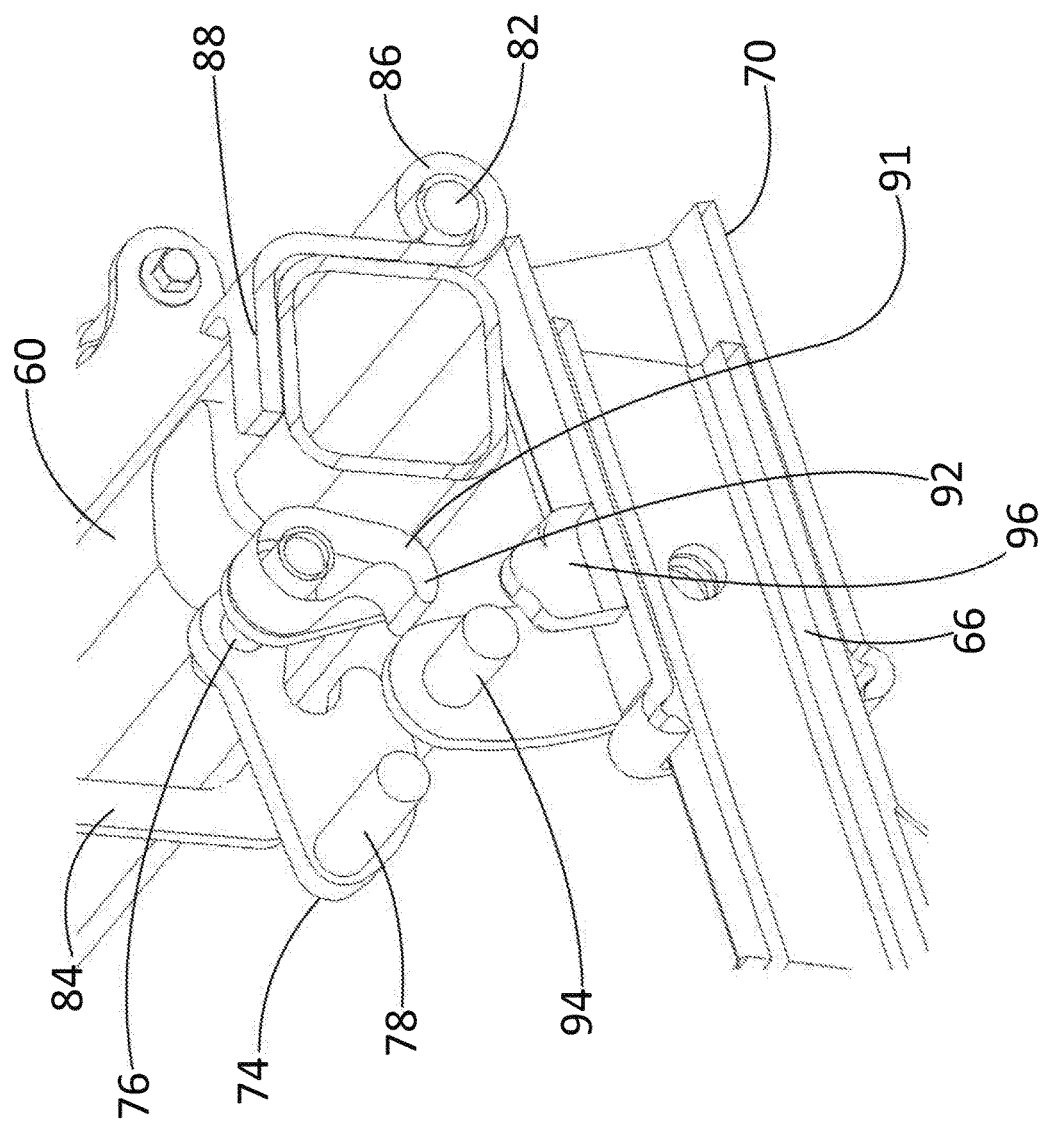
FIG. 8 is a sectional view of the articulating receiver assembly in which the receiver is locked in its released and lowered position.
Figure 9:
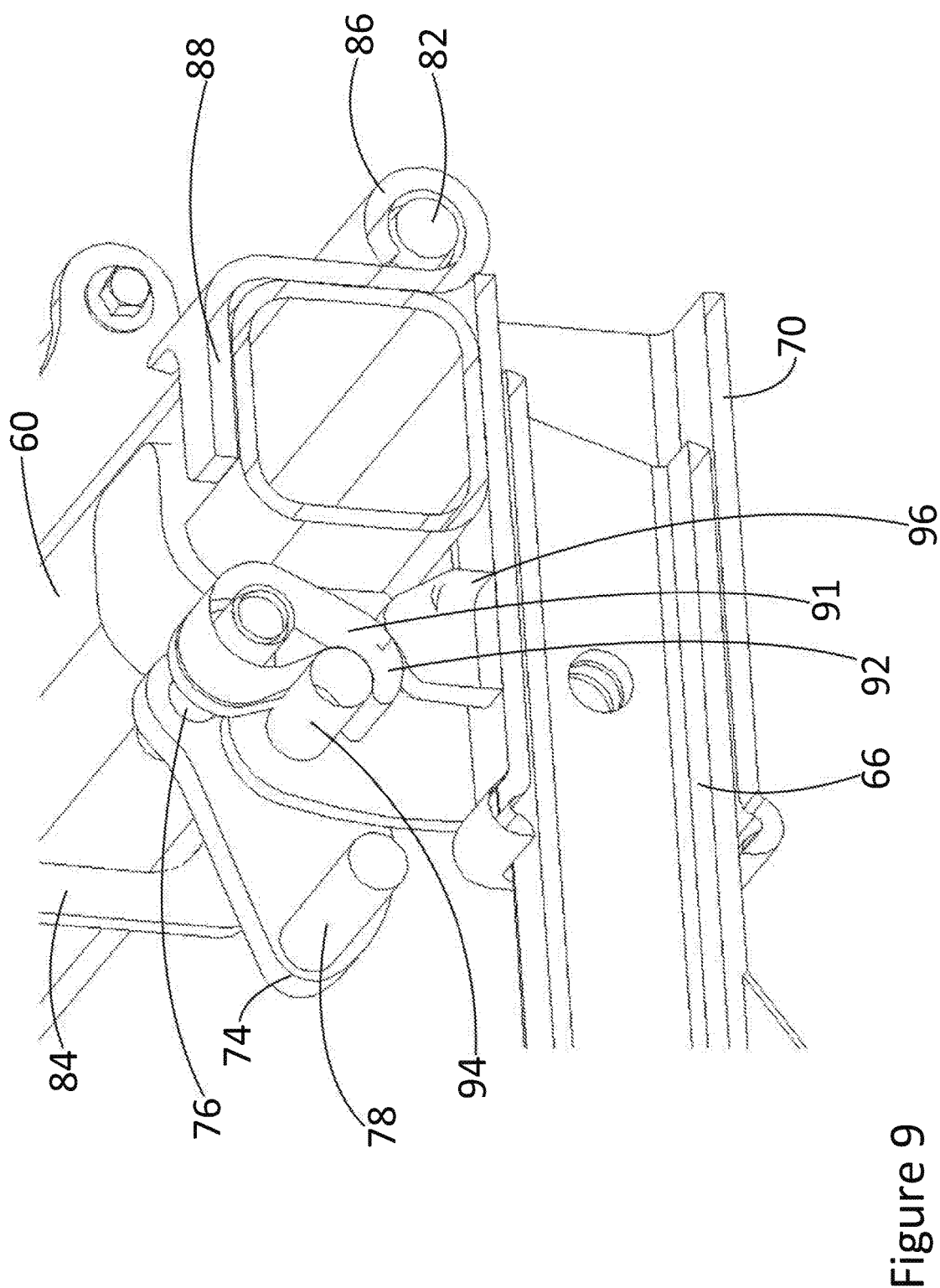
FIG. 9 is a view similar to that of FIG. 8 but illustrating the receiver in its raised or elevated position.
Figure 10:
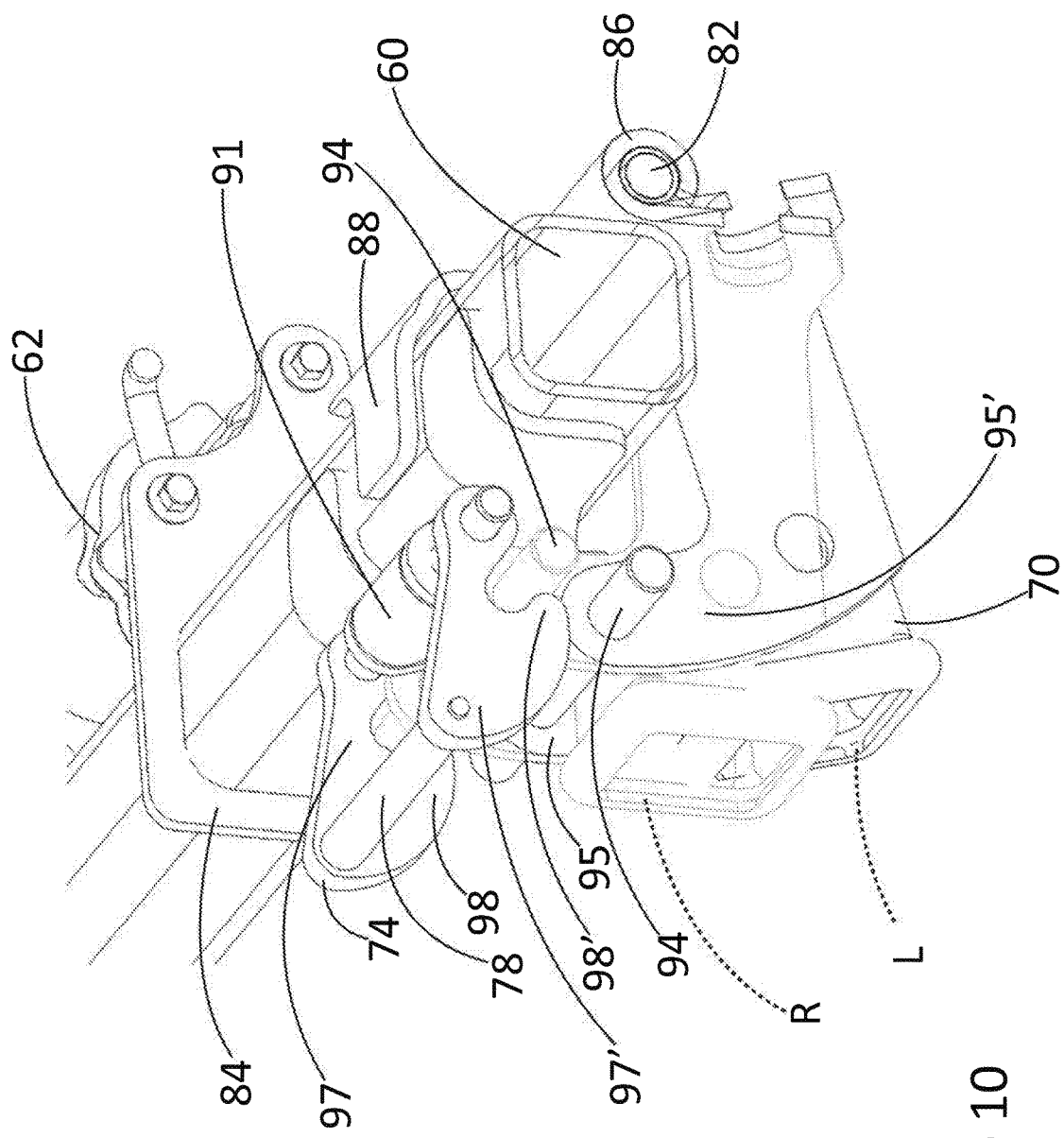
FIG. 10 is a view similar to that of FIGS. 8 and 9 but showing the receiver reversibly movable between its raised and lowered positions.

FIGS. 8 through 10 provide a sectional view of the articulating receiver assembly 64 of the articulating hitch assembly 50 in its various positions. Referring to these figures, a latch capture pawl 91 having a hook portion 92 is illustrated. The latch capture pawl 91 is attached to the common pivot 76 shared with the safety latch handle 78. A pawl capture shaft 94 is fixed between two spaced apart receiver arm supports 95 and 95'. A pawl movement restricting bumper 96 is fixed to the upper surface of the receiver of the receiver assembly 70.

The safety latch handle 78 includes a pair of spaced apart arms 97 and 97'. The arm 97 includes a hook portion 98 while the arm 97' includes a hook portion 98'.

In operation, and referring to FIG. 8 in which the articulating receiver assembly 64 is in its lowered or disengaged position, the latch capture pawl 91 is spaced apart from the pawl capture shaft 94 and the safety latch assembly 74 is in its released position. This is the position that the articulating hitch assembly 50 would assume when the autonomous tow vehicle is being positioned such that the ball of the ball mount 66 is immediately below the hitch coupler of the trailer.

Once the vehicle verifies that ball mount 66 is in its proper position relative to the trailer's hitch coupler, the drive rod 82 of the electric motor and rod assembly 62 is caused to rotate, thus rotating the spaced apart rotating sleeves 90 and 90' and their associated receiver assembly 70 in a direction whereby the ball of the ball mount 66 is positioned within the ball socket of the hitch coupler. This movement results simultaneously in the hook portion 92 of the latch capture pawl 91 being captured between the pawl capture shaft 94 and the upper side of the pawl movement restricting bumper 96. This movement continues until both the ball of the ball mount 66 rests securely within the ball socket of the hitch coupler and the latch capture pawl 91 is attached to the pawl capture shaft 94 as illustrated in FIG. 9. The latch capture pawl 91 is provided with a biasing member (not shown) that urges it to the position shown in FIG. 8.

In addition to the ball of the ball mount 66 resting in the ball socket of the hitch coupler and the hook portion 92 of the latch capture pawl 91 being captured as described, the safety latch handle 78 of the safety latch assembly 74 is moved by a biasing member (not shown) to the position shown in FIG. 10 in which the hook portions 98 and 98' of the safety latch arms 97 and 97' also respectively hook onto the pawl capture shaft 94 thereby providing an added measure of attachment security.

In operation and regardless of the embodiment, the receiver is first moved to its lowered position when it is desired to have the autonomous tow vehicle become coupled to the trailer to be towed. The vehicle is then moved into a position in which the trailer ball of the vertically articulating hitch assembly is positioned below the ball socket of the trailer's hitch coupler. Once this correct position is confirmed, the trailer ball is raised until it nests within the ball socket of the hitch coupler and the movable assembly to which the trailer ball is attached is locked into position by one of the arrangements described above. While the preceding description is generally directed to the vertically articulating trailer hitch assembly in association with an autonomous tow vehicle, it is to be understood that the hitch assembly of the disclosed inventive concept may as easily find utility with a conventional tow vehicle as noted.

One skilled in the art will readily recognize from such discussion, and from the accompanying drawings and claims that various changes, modifications and variations can be made therein without departing from the true spirit and fair scope of the invention as defined by the following claims.

What is claimed is:

1. A height adjustable trailer hitch assembly for connecting a trailer hitch coupler to a towing vehicle having a frame having a long axis, the assembly comprising:
   a receiver assembly including a receiver and a latch capture pawl having a hook portion; and
   a receiver attachment assembly including a lateral tube for pivotally attaching said receiver assembly to the frame,
   wherein said receiver assembly is movable between positions of axial alignment and non-alignment with the long axis of the frame,
   wherein said latch capture pawl is pivotally attached to said lateral tube.

2. The height adjustable trailer hitch assembly of claim 1 in which said lateral tube is perpendicular to the long axis of the vehicle frame.

3. The height adjustable trailer hitch assembly of claim 1 further including an electric motor and rod assembly for moving said receiver assembly between said positions of axial alignment and non-axial alignment.

4. The height adjustable trailer hitch assembly of claim 1, wherein said latch capture pawl locks said receiver assembly in said position of axial alignment.

5. The height adjustable trailer hitch assembly of claim 4 in which said receiver assembly includes a ball mount pin and clip assembly.

6. The height adjustable trailer hitch assembly of claim 1 further including a pawl capture shaft attached to said receiver, said latch capture pawl being engageable with said pawl capture shaft.

7. The height adjustable trailer hitch assembly of claim 6 further including a safety latch handle for manually releasing said latch capture pawl from said pawl capture shaft.

* * * * *